United States Patent [19]

Tanaka

[11] Patent Number: 5,739,966

[45] Date of Patent: Apr. 14, 1998

[54] IMAGING LENS SYSTEM

[75] Inventor: Kazuyuki Tanaka, Chohu, Japan

[73] Assignee: Olympus Optical Co., Ltd., Tokyo, Japan

[21] Appl. No.: 801,210

[22] Filed: Feb. 18, 1997

[30] Foreign Application Priority Data

Feb. 19, 1996 [JP] Japan ................................ 8-053695

[51] Int. Cl.⁶ ........................... G02B 9/34; G02B 13/22; G02B 13/18; G02B 13/04

[52] U.S. Cl. .................... 359/779; 359/663; 359/715; 359/740; 359/753

[58] Field of Search ...................... 359/753, 663, 359/715, 740, 779

[56] References Cited

U.S. PATENT DOCUMENTS 2,600,805  6/1952  Reiss ........................ 359/753
2,694,959  11/1954  Baker ........................ 359/753
3,633,985  1/1972  Mouchart ................... 359/779

FOREIGN PATENT DOCUMENTS 5-040220  2/1993  Japan.
5-107472  4/1993  Japan.

*Primary Examiner*—Scott J. Sugarman
*Attorney, Agent, or Firm*—Cushman Darby & Cushman IP Group of Pillsbury Madison & Sutro LLP

[57] ABSTRACT

An imaging lens system consisting of a front lens unit which comprises a negative lens component disposed on the image side and has a positive refractive power, and a rear lens unit which is composed of a positive lens component: a distance ffb as measured from an object side surface of the rear lens unit to a front focal point of the rear lens unit, a distance D as measured from an exit pupil of the front lens unit to an object side surface of the rear lens unit, and refractive powers of the front lens unit and the rear lens unit being adequately defined for the imaging lens system.

10 Claims, 3 Drawing Sheets

IMAGING LENS SYSTEM

BACKGROUND OF THE INVENTION a) Field of the invention:

The present invention relates to an imaging lens system which is to be used, for example, in optical systems for image readers such as image scanners.

b) Description of the prior art:

For imaging lens systems for reading images which are used image scanners of a type to image original images on image pickup surfaces of image pickup devices such as CCDs, it is required to have high resolution at imaging magnifications used, reserve large amounts of marginal rays, produce distortion in small amounts and be substantially telecentric on the image side.

Known as conventional imaging lens systems meeting these requirements are Gauss type lens systems such as that disclosed by Japanese Patent Kokai Publication No. Hei 5-107472. However, each of these Gauss type imaging lens systems comprises five or more lens elements and is large, thereby unavoidably enlarging image readers and enhancing a manufacturing cost therefor.

An optical system which is composed of four lens elements and telecentric on the image side generally adopts a composition like that of a optical system for video cameras such as a lens system disclosed by Japanese Patent Kokai Publication No. Hei 5-40220, i.e., the so-called retrofocus composition consisting of a front lens unit having a negative refractive power and a rear lens unit having a positive refractive power. This composition is selected for a reason that the optical system must have a back focal length sufficiently long relative to a focal length thereof for allowing optical members such as a low pass filter between an image pickup device and the optical system, and obtaining a telecentric composition on the image side. However, such a retrofocus type lens system is unavoidably be large since it has a total length large relative to its focal length and produces a large amount of distortion which poses a most serious problem for image readers since the optical system has an asymmetrical refractive power distribution. For correcting distortion, it is unavoidable to dispose an increased number of lens elements in the optical system and enlarge its total length.

SUMMARY OF THE INVENTION

A primary object of the present invention is to provide an imaging lens system for reading images which is composed of a small number of lens elements, has a small total length, is compact, can be manufactured at a low cost and nevertheless forms an image of a high quality.

The imaging lens system according to the present invention is characterized in: that it uses a stop disposed in the lens system; that it is composed of a front lens unit which comprises a negative lens component disposed on the image side and has a positive refractive power as a whole, and a rear lens unit which is composed of a positive lens component; and that the lens system satisfies the following conditions (1) and (2):

(1) $1.0 < \text{ffb}/D < 3.0$ (2) $0.5 < f_F/f_B < 2.0$

DETAILED DESCRIPTION OF THE PREFERRED EMBODIMENTS

Figure 1:
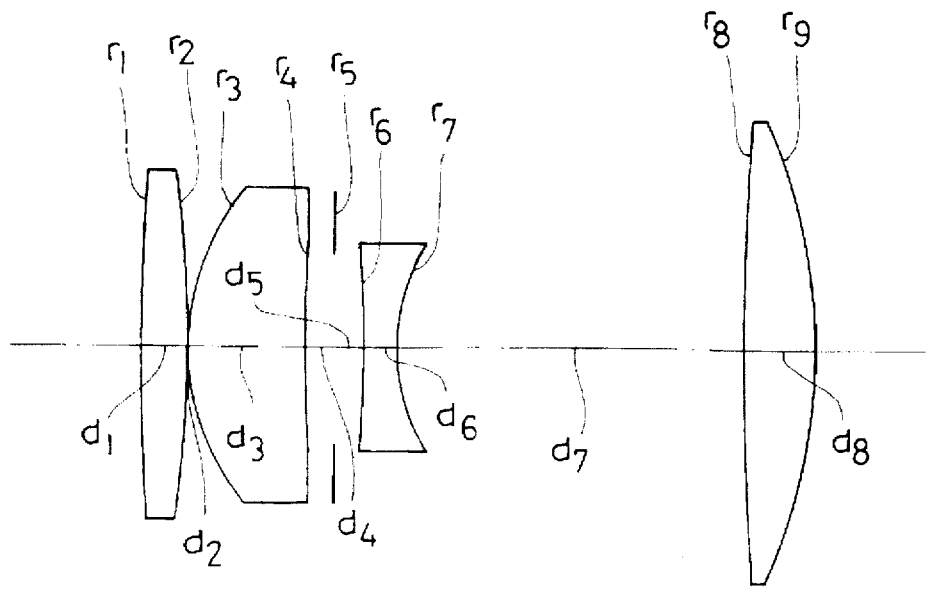
FIG. 1 through FIG. 6 show sectional views illustrating compositions of first through sixth embodiments of the imaging lens system according to the present invention.

The imaging lens system according to the present invention comprises a stop disposed in the lens system; is composed of a front lens unit which comprises a negative lens component disposed on the image side and has a positive refractive power as a whole, and a rear lens unit which is composed of a positive lens component; and satisfies the following conditions (1) and (2):

(1) $1.0 < \text{ffb}/D < 3.0$ (2) $0.5 < f_F/f_B < 2.0$ wherein the reference symbol ffb represents a distance as measured from an object side surface of the rear lens unit to a front focal point thereof, the reference symbol D designates a distance as measured from an exit pupil of the front lens unit to an object side surface of the rear lens unit, the reference symbol $f_F$ denotes a focal length of the front lens unit and the reference symbol $f_B$ represents a focal length of the rear lens unit.

Brightness of the imaging lens system for reading images is determined by disposing the stop in the lens system as described above. When the stop is disposed before the lens system, the rear lens unit is enlarged, thereby enlarging the lens system as a whole. When the stop is disposed after the lens system, it is difficult to configure the lens system so as to be telecentric on the image side.

For configuring an optical system so as to be telecentric on the image side, it is desirable to use a positive lens component having a strong refractive power in a rear lens unit. In such a case, however, it is difficult to suppress offaxial aberrations with a small number of lens components while maintaining a strong refractive power. In the imaging lens system according to the present invention, coma produced by the rear lens unit is corrected by disposing a lens component which has a concave surface on the image side at an image side location in the front lens unit and chromatic aberration is corrected by imparting a negative refractive power to this lens component.

In the imaging lens system according to the present invention, distortion in particular can be suppressed by configuring the front lens unit and the rear lens unit so as as to have focal lengths which are substantially equal to each other. Further, the imaging lens system according to the present invention is configured so as to be substantially telecentric on the image side by selecting a positive refractive power for the rear lens unit.

The above-mentioned condition (1) defines a ratio of an airspace to be reserved between the front lens unit and the rear lens unit relative to the focal length of the front lens unit for configuring the optical system so as to be substantially telecentric on the image side by locating an exit pupil of the front lens unit in the vicinity of a front focal point of the rear lens unit. If the upper limit of 3.0 of the condition (1) is exceeded, it will be impossible to obtain an optical system which is substantially telecentric on the image side, an aperture efficiency will be lowered and an amount of marginal rays will be remarkably reduced. If the lower limit of 1.0 of the condition (1) is exceeded, in contrast, it will be difficult to suppress offaxial aberrations.

The above-mentioned condition (2) defines a ratio of the focal length of the rear lens unit relative to the focal length of the front lens unit. By defining this ratio within a predetermined range, the imaging lens system according to the present invention is configured to correct aberrations of the offaxial rays produced in the front lens unit by the rear lens unit. If $f_F/f_B$ has a value exceeding the upper limit of 2.0 of the condition (2), it will be difficult to reduce offaxial aberrations, or distortion and coma. If the lower limit of 0.5 of the condition (2) is exceeded, in contrast, it will be difficult to suppress lateral chromatic aberration.

Further, it is possible to configure the optical system according to the present invention so as to be compact by configuring it so as to satisfy the following condition (3):

(3) $0.1 < h/f < 0.5$ wherein the reference symbol h represents an image height and the reference symbol f designates a focal length of the imaging lens system as a whole.

Since scanners proper which are to use imaging lens systems such as that according to the present invention are frequently employed for recording images in personal computers and configured compacter in these days, it is desirable to configure the imaging lens systems compact.

The condition (3) has been adopted to meet the requirement described above. If the imaging lens system has a focal length exceeding the lower limit of 0.1 of the condition (3), the lens system will be large, thereby undesirably enlarging the scanners proper. If the imaging lens system has a focal length which is too short or exceeds the upper limit of 0.5 of the condition (3), it will be difficult to suppress aggravation of offaxial aberrations.

Further, it is possible to correct tilting of an image surface in particular by configuring the imaging lens system according to the present invention so as to satisfy the following condition (4):

(4) $0.2 < f/L < 0.4$ wherein the reference symbol L represents a distance as measured from an object point to an image point and the reference symbol f represents a focal length of the imaging lens system as a whole.

An imaging lens system for reading images such as that according to the present invention should desirably be configured so as to have not only high resolution but also a small difference between performance for central portions of images and that for marginal portions. When a line sensor type image pickup device is used in particular, a large difference between performance for the central portions of images and that for the marginal portions allows performance to be degraded uniformly in a scanning direction. For preventing such degradation in performance, it is desirable to configure an imaging lens system so as to not only scarecely attenuate marginal rays and produce distortion in a small amount but also form an image surface which is flat from central portions to marginal portions.

The condition (4) has been adopted to satisfy this desire. If the distance between an object point and an image point is short enough to exceed the upper limit of 0.4 of the condition (4), curvature of field will be too remarkable, thereby making it impossible to obtain sufficient performance without increasing a number of lens components to be disposed in the imaging lens system. If the distance between the object point and the image point is long enough to exceed the lower limit of 0.2 of the condition (4), in contrast, the imaging lens system will be large, thereby undesirably enlarging the scanners proper.

The front lens unit is configured as a telephoto type by disposing the negative lens component on the image side. As a result, it is possible to displace a rear principal point of the front lens unit toward the object side so as to shorten a total length of the front lens unit. For allowing offaxial rays emerging from the front lens unit to be incident higher on the rear lens unit, it is desirable to shorten a radius of curvature on the image side surface of the negative lens component disposed on the image side.

For shortening a total length of an optical system, it is necessary to strengthen refractive powers of lens components to be used for composing the optical system. For favorably correcting aberrations over an entire range from the central portions to the marginal portions, on the other hand, it is desirable to distribute refractive powers with a high efficiency so that rays pass through the optical system while being refracted smooth. For refracting rays smooth with a small number of lens components, it is therefore desirable to dispose two lens components having convex surfaces opposed to each other at least in the front lens unit.

Further, for enhancing rays when the stop is disposed in the front lens unit, an emergence side surface of the negative lens component disposed on the image side is configured as a negative refracting surface which is convex toward the stop. Accordingly, offaxial rays are incident at large angles on this surface, thereby producing a large amount of distortion which is an offaxial aberration. For correcting this distortion, it is desirable to use, in the rear lens unit, a lens component having a positive refracting surface on which angles of incidence are large, i.e., a surface which is convex toward the stop.

Further, for configuring an optical system so as to be substantially telecentric on the image side, it is desirable that a rear lens unit has a refractive power of a certain degree. For correcting distortion with a small number of lens components and configuring the optical system so as to be telecentric on the image side, it is desirable to use a biconvex lens component in the rear lens unit.

For configuring the imaging lens system according to the present invention so as to be more telecentric on the image side and obtain illuminance which is uniform over to the marginal portions by enhancing an aperture efficiency, it is desirable to modify the upper limit of the abovementioned condition (1) to 2.5, or satisfy the following condition (1-1):

(1-1) $1.0 < ffb/D < 2.5$

Furthermore, it is desirable for obtaining a portable scanner to further shorten the total length of the optical system. For this purpose, it is desirable to modify the lower limit of the condition ((1) to 1.4, or satisfy the following condition (1-2):

(1-2) $1.4 < ffb/D < 3.0$

When the imaging lens system has a magnification of approximately 1x, it is desirable for more favorable correction of distortion and coma which are offaxial aberrations to modify the lower limit of the condition (2) to 0.70, or satisfy the following condition (2-1):

(2-1) $0.70 < f_F/f_B < 2.0$

When the imaging lens system has an imaging magnification of approximately 1x, it is desirable for favorable correction of lateral chromatic aberration which is an offaxial aberration to modify the upper limit of the abovementioned condition (2) to 1.25, or satisfy the following condition (2-2):

(2-2) $0.5 < f_F/f_B < 1.25$

For more favorable correction of offaxial aberrations while maintaining a wide field angle, it is desirable to modify the upper limit of the condition (3) to 0.35, or satisfy the following condition (3-1):

(3-1) $0.1 < h/f < 0.35$

For further shortening the total length of the optical system while maintaining the wide field angle, it is desirable to modify the lower limit of the condition (3) to 0.25, or satisfy the following condition (3-2):

(3-2) $0.25 < f/f < 0.5$

For obtaining high resolution over the entire range from the central portions to the marginal portions by more favorably correcting tilting of the image surface, it is desirable to modify the lower limit of the above-mentioned condition (4) to 0.25, or satisfy the following condition (4-1):

(4-1) 0.25<f/L<0.4

Moreover, for further shortening the total length of the optical system while maintaining the flat image surface, it is desirable to modify the upper limit of the condition (4) to 0.35, or satisfy the following condition (4-2):

(4-2) 0.2<f/L<0.35

The imaging lens system according to the present invention can exhibit optical performance high enough for practical use even when it is set in the reverse direction.

Embodiments of the imaging lens system according to the present invention have compositions illustrated in FIG. 1 through FIG. 6 and numerical data which is listed below:

Embodiment 1
f = 38.12, β = −0.90, 2ω = 32.8°

| | | | |
|---|---|---|---|
| $r_1 = 97.9284$ | $d_1 = 2.0561$ | $n_1 = 1.75000$ | $v_1 = 25.14$ |
| $r_2 = -55.9452$ | $d_2 = 0.064$ | | |
| $r_3 = 11.0507$ | $d_3 = 4.9894$ | $n_2 = 1.69680$ | $v_2 = 55.53$ |
| $r_4 = 88.7855$ | $d_4 = 1.3142$ | | |
| $r_5$ stop | $d_5 = 1.2438$ | | |
| $r_6 = -49.3402$ | $d_6 = 1.4845$ | $n_3 = 1.83350$ | $v_3 = 21.00$ |
| $r_7 = 8.4831$ | $d_7 = 15.000$ | | |
| $r_8 = 144.7648$ | $d_8 = 3.0526$ | $n_4 = 1.81600$ | $v_4 = 46.62$ |
| $r_9 = -24.6775$ | | | | ffb/D = 1.47, $f_F/f_B$ = 1.88, h/f = 0.295, f/L = 0.303

Embodiment 2
f = 39.61, β = −0.80, 2ω = 31.8°

| | | | |
|---|---|---|---|
| $r_1 = 59.7186$ | $d_1 = 2.0651$ | $n_1 = 1.78472$ | $v_1 = 25.68$ |
| $r_2 = -122.1755$ | $d_2 = 0.2$ | | |
| $r_3 = 12.4081$ | $d_3 = 4.9894$ | $n_2 = 1.69680$ | $v_2 = 55.53$ |
| $r_4 = 219.547$ | $d_4 = 1.3142$ | | |
| $r_5$ stop | $d_5 = 1.2438$ | | |
| $r_6 = -54.2828$ | $d_6 = 1.4845$ | $n_3 = 1.83350$ | $v_3 = 21.00$ |
| $r_7 = 9.7881$ | $d_7 = 16.000$ | | |
| $r_8 = 87.12$ | $d_8 = 3.0526$ | $n_4 = 1.77250$ | $v_4 = 49.60$ |
| $r_9 = -31.8795$ | | | | ffb/D = 1.67, $f_F/f_B$ = 1.75, h/f = 0.285, f/L = 0.286

Embodiment 3
f = 32.97, β = −0.99, 2ω = 37.6°

| | | | |
|---|---|---|---|
| $r_1 = 70.1139$ | $d_1 = 3.5123$ | $n_1 = 1.75500$ | $v_1 = 52.33$ |
| $r_2 = -60.9863$ | $d_2 = 0.2$ | | |
| $r_3 = 12.0198$ | $d_3 = 4.6382$ | $n_2 = 1.69680$ | $v_2 = 55.53$ |
| $r_4 = 61.7225$ | $d_4 = 1.5685$ | | |
| $r_5$ stop | $d_5 = 1.3542$ | | |
| $r_6 = -79.2331$ | $d_6 = 1.0834$ | $n_3 = 1.75211$ | $v_3 = 25.05$ |
| $r_7 = 9.5173$ | $d_7 = 12.000$ | | |
| $r_8 = 51.6409$ | $d_8 = 4.7971$ | $n_4 = 1.72000$ | $v_4 = 41.98$ |
| $r_9 = -42.4369$ | | | | ffb/D = 2.30, $f_F/f_B$ = 1.20, h/f = 0.340, f/L = 0.269

Embodiment 4
f = 28.68, β = −1.13, 2ω = 42.8°

| | | | |
|---|---|---|---|
| $r_1 = 44.3094$ | $d_1 = 1.455$ | $n_1 = 1.81690$ | $v_1 = 46.62$ |
| $r_2 = -52.01903$ | $d_2 = 0.2000$ | | |
| $r_3 = 10.8800$ | $d_3 = 3.2695$ | $n_2 = 1.72916$ | $v_2 = 54.68$ |
| $r_4 = 75.2911$ | $d_4 = 0.7507$ | | |
| $r_5$ = stop | $d_5 = 0.5675$ | | |
| $r_6 = -124.1421$ | $d_6 = 3.0000$ | $n_3 = 1.75211$ | $v_3 = 25.05$ |
| $r_7 = 7.8115$ | $d_7 = 15.500$ | | |
| $r_8 = 49.5563$ | $d_8 = 3.0000$ | $n_4 = 1.6968$ | $v_4 = 55.53$ |
| $r_9 = -46.8257$ | | | | ffb/D = 1.96, $f_F/f_B$ = 0.75, h/f = 0.392, f/L = 0.286

Embodiment 5
f = 31.81, β = −0.98, 2ω = 38.96°

| | | | |
|---|---|---|---|
| $r_1 = 47.2209$ | $d_1 = 2.0$ | $n_1 = 1.6968$ | $v_1 = 55.53$ |
| $r_2 = -45.1282$ | $d_2 = 0.2$ | | |
| $r_3 = 10.7905$ | $d_3 = 3.6373$ | $n_2 = 1.69680$ | $v_2 = 55.53$ |
| $r_4 = 37.0462$ | $d_4 = 1.5$ | | |
| $r_5$ stop | $d_5 = 1.5$ | | |
| $r_6 = -144.7681$ | $d_6 = 0.9570$ | $n_3 = 1.78472$ | $v_3 = 25.68$ |

-continued

| | | | |
|---|---|---|---|
| $r_7 = 8.5811$ | $d_7 = 14.0804$ | | |
| $r_8 = 56.5472$ | $d_8 = 2.5$ | $n_4 = 1.80610$ | $v_4 = 40.95$ |
| $r_9 = -51.9329$ | | | | ffb/D = 2.10, $f_F/f_B$ = 1.00, h/f = 0.280, f/L = 0.345

Embodiment 6
f = 34.27, β = −0.95, 2ω = 36.4°

| | | | |
|---|---|---|---|
| $r_1 = 44.3030$ | $d_1 = 1.4347$ | $n_1 = 1.72916$ | $v_1 = 54.68$ |
| $r_2 = -60.1092$ | $d_2 = 2.0000$ | | |
| $r_3 = 12.1143$ | $d_3 = 5.5019$ | $n_2 = 1.69680$ | $v_2 = 55.53$ |
| $r_4 = 73.5919$ | $d_4 = 0.9826$ | | |
| $r_5$ stop | $d_5 = 1.1392$ | | |
| $r_6 = -77.4661$ | $d_6 = 1.6002$ | $n_3 = 1.84666$ | $v_3 = 23.78$ |
| $r_7 = 9.4291$ | $d_7 = 15.0000$ | | |
| $r_8 = 50.3379$ | $d_8 = 3.0000$ | $n_4 = 1.83481$ | $v_4 = 42.72$ |
| $r_9 = -54.072$ (aspherical surface) | | | | aspherical surface coefficients
K = 0, $A_4 = 2.572 \times 10^{-6}$, $A_6 = -6.556 \times 10^{-9}$
ffb/D = 1.82, $f_F/f_B$ = 1.03, h/f = 0.329, f/L = 0.299 wherein the reference symbols $r_1, r_1, \ldots$ represent radii of curvature on surfaces of respective lens components, the reference symbols $d_1, d_2, \ldots$ designate thicknesses of the respective lens components and airspaces reserved therebetween, the reference symbols $n_1, n_2, n_3$ and $n_4$ denote refractive indices of the respective lens components, and the reference symbols $v_1, v_2, v_3$ and $v_4$ represent Abbe's numbers of the respective lens components.

The first embodiment has a composition illustrated in FIG. 1 or is composed of: a front lens unit which consists, in order from the object side, of a biconvex lens component, a positive meniscus lens component having a convex surface on the object side, a stop and a biconcave lens component, and has a positive refractive power as a whole; and a rear lens unit which consists of a single biconvex lens component. The imaging lens system preferred as the first embodiment satisfies the above-mentioned conditions (1), (2), (3) and (4). This imaging lens system has an imaging magnification of 0.90x.

Figure 2:
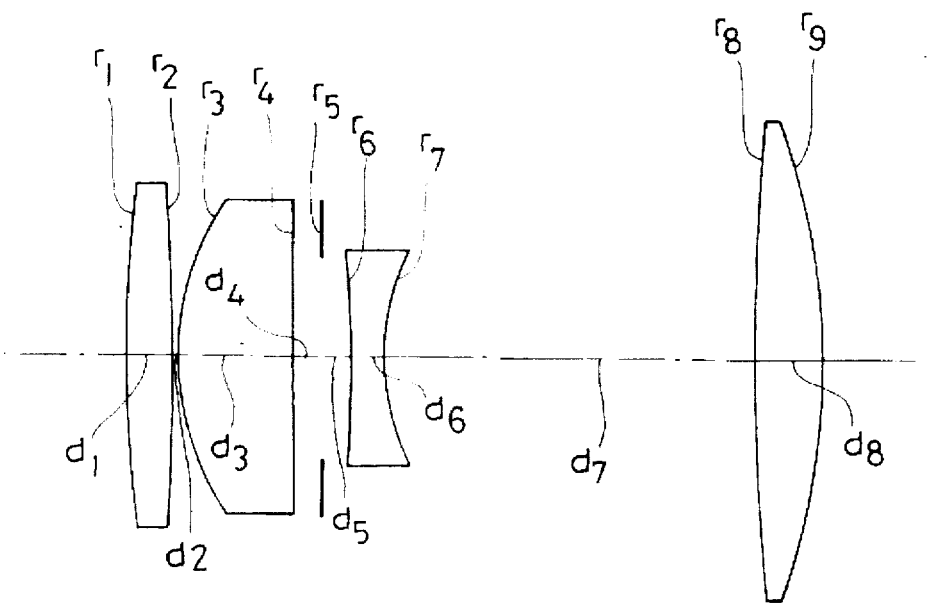

The second embodiment has a composition which is illustrated in FIG. 2 or similar to that of the first embodiment. The second embodiment satisfies the conditions (1), (2), (3) and (4). The imaging lens system preferred as the second embodiment has an imaging magnification of 0.80x.

Figure 3:
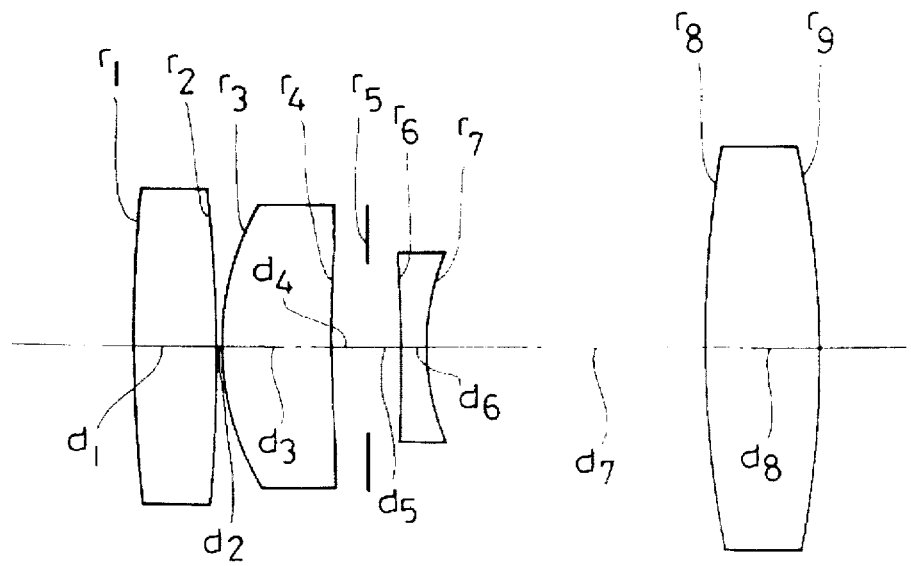

The third embodiment has the composition which is illustrated in FIG. 3 or the same as that of the first embodiment, and satisfies the conditions (1), (2), (3) and (4). The imaging lens system preferred as the third embodiment has an imaging magnification of 0.99x.

Figure 4:
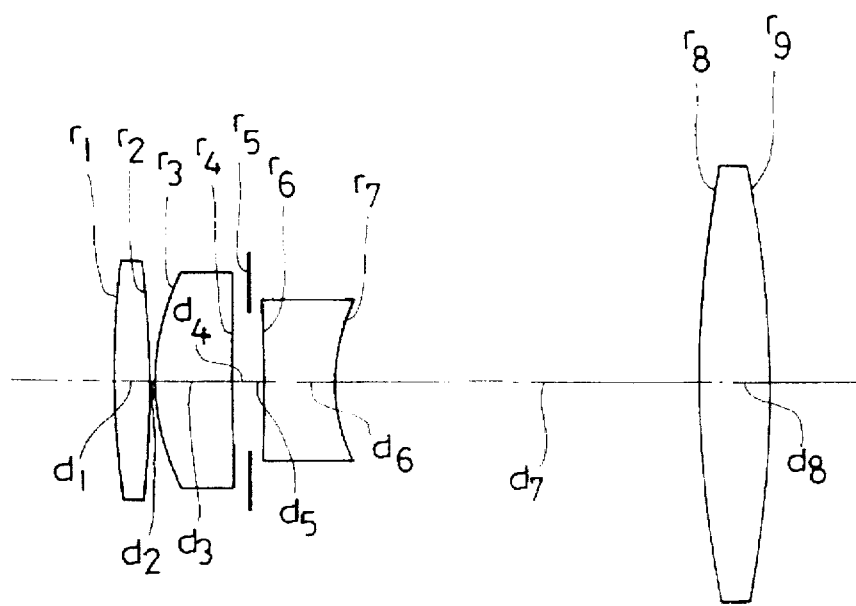

The fourth embodiment has a composition which is shown in FIG. 4 or the same as that of the first embodiment, and satisfies the conditions (1), (2), (3) and (4). This embodiment is an imaging lens system having an imaging magnification of 1.13x.

Figure 5:
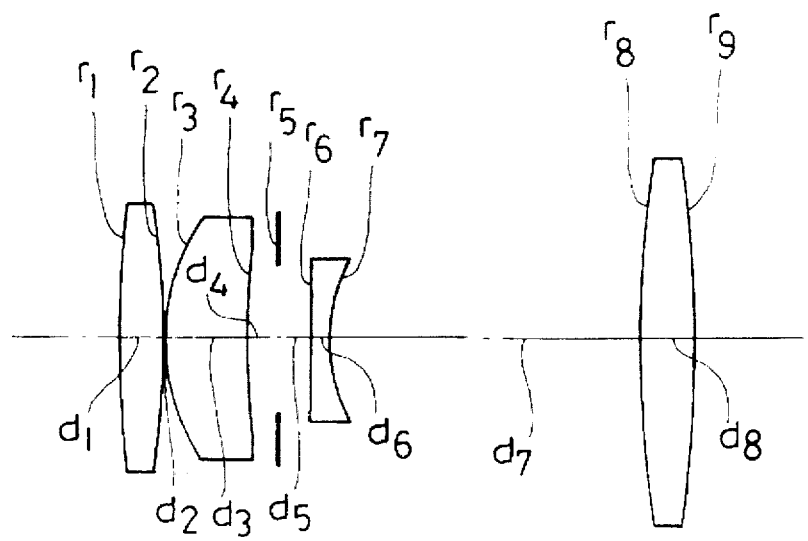

The fifth embodiment has a composition which is shown in FIG. 5 or similar to that of the first embodiment, and satisfies the conditions (1), (2), (3) and (4). This embodiment is an imaging lens system having an imaging magnification of 0.98x.

Figure 6:
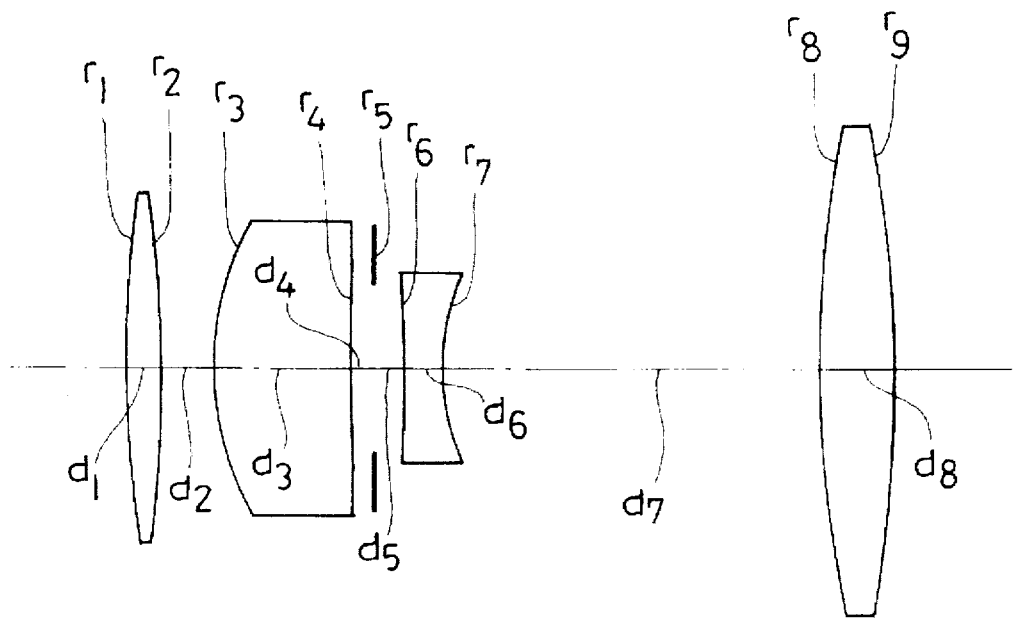

The sixth embodiment has a composition which is illustrated in FIG. 6 or similar to that of the first embodiment. This embodiment also satisfies the conditions (1), (2), (3) and (4). The sixth embodiment corrects aberrations more favorably by adopting an aspherical surface as an emergence side surface of a fourth lens component on which axial and offaxial light bundles are remarkably separated from each other. This aspherical surface has such a shape as to weaken a positive refractive power as portions of the aspherical surface are farther from an optical axis and serves for favorably correcting coma in particular. The sixth embodiment has an imaging magnification of 0.95x.

The aspherical surface used in the embodiment described above has a shape expressed by the formula shown below:

$$x = \frac{Cy^2}{1+\sqrt{1-(1+K)C^2y^2}} + A_4y^4 + A_6y^6 + \ldots$$

wherein the reference symbol x represents a distance as measured from a plane which is tangental on a vertex of the aspherical surface to a point on the aspherical surface located at a height of y above the optical axis, the reference symbol C designates curvature of the aspherical surface, the reference symbol K denotes a conical coefficient, and the reference symbols $A_4$, $A_6$, ... represent aspherical surface coefficients.

Though a stop is disposed on a fifth surface ($r_5$) in each of the embodiments described above, the effects of the present invention can be obtained so far as a stop is disposed in the front lens unit. Further, the aspherical surface can exhibit the effects for correcting aberrations, etc. not only when it is used as the image side surface of the sixth embodiment but also when it is used as any one of the lens surfaces.

The imaging lens system according to the present invention is compact, capable of correcting aberrations with good balance and suited for use in optical systems having finite object distances though the lens system is composed only of the four lens components and telecentric on the image side (emergence side).

I claim:

1. An imaging lens system comprising in order from the object side: a front lens unit having a positive refractive power; and a rear lens unit having a positive refractive power, wherein a stop is disposed in the lens system and wherein said lens system satisfies the following conditions (1) and (2):

(1) 1.0<ffb/D<3.0

(2) 0.5<$f_F/f_B$<2.0 wherein the reference symbol ffb represents a distance as measured from an object side surface of said rear lens unit to a front focal point of said rear lens unit, the reference symbol D designates a distance as measured from an exit pupil of said front lens unit to the object side surface of said rear lens unit, the reference symbol $f_F$ denotes a focal length of said front lens unit and the reference symbol $f_B$ represents a focal length of said rear lens unit.

2. An imaging lens system according to claim 1 wherein said front lens unit comprises a subunit comprising at least two positive lens components disposed on the object side and at least one negative lens component disposed on the image side.

3. An imaging lens system according to claim 1 wherein said rear lens unit comprises at least one positive lens component.

4. An imaging lens system according to claim 1 satisfying the following condition (3):

(3) 0.1<h/f<0.5 wherein the reference symbol h represents an image height and the reference symbol f designates a focal length of said imaging lens system as a whole.

5. An imaging lens system according to claim 1 satisfying the following condition (4):

(4) 0.2<f/L<0.4 wherein the reference symbol f represents a focal length of said imaging lens system as a whole and the reference symbol L designates a distance as measured from an object point to an image point.

6. An imaging lens system according to claim 2 wherein said stop is disposed between the positive lens component disposed on the image side and said negative lens component in said front lens unit.

7. An imaging lens system according to claim 2 wherein said negative lens component disposed in said front lens unit has a concave surface on the image side and a radius of curvature on the image side surface is shorter than a radius of curvature on an object side surface of said negative lens component.

8. An imaging lens system according to claim 2 wherein the positive subunit comprised in said front lens unit consists of two positive lens components which have convex surfaces opposed to each other.

9. An imaging lens system according to claim 3 wherein the positive lens component comprised in said rear lens unit has an aspherical surface.

10. An imaging lens system according to claim 1 wherein said front lens unit comprises a negative lens component disposed on the image side and said rear lens unit is composed of a positive lens component.

* * * * *